United States Patent [19]

Wood

[11] 4,266,961
[45] May 12, 1981

[54] OVERRIDE SYSTEM FOR GLASS FORMING MACHINERY

[75] Inventor: Charles L. Wood, Muncie, Ind.
[73] Assignee: Ball Corporation, Muncie, Ind.
[21] Appl. No.: 79,368
[22] Filed: Sep. 27, 1979

Related U.S. Application Data

[63] Continuation of Ser. No. 898,213, Apr. 20, 1978, abandoned.

[51] Int. Cl.³ .......................... C03B 7/14; C03B 9/40; C03B 11/16
[52] U.S. Cl. .......................................... 65/29; 65/158; 65/163; 65/164; 65/DIG. 13; 364/473; 364/476
[58] Field of Search .................... 65/29, 158, 163, 164, 65/DIG. 13; 364/473, 476

[56] References Cited

U.S. PATENT DOCUMENTS

| | | | |
|---|---|---|---|
| Re. 29,188 | 4/1977 | Croughwell | 65/DIG. 13 |
| 3,184,725 | 6/1961 | Siegel et al. | 65/DIG. 13 |
| 4,007,028 | 2/1977 | Bublitz et al. | 65/163 |

Primary Examiner—Arthur D. Kellogg
Attorney, Agent, or Firm—Gilbert E. Alberding

[57] ABSTRACT

A glass forming machine having a plurality of sections each of which includes a plurality of movable components which operate in timed relationship with respect to one another. An electronic control system effects the automatic synchronous operation of the various sections of the machine to thereby automatically and continuously form hollow glass articles. An automatic override system monitors each of the plurality of sections to determine whether each of the plurality of movable components are in the proper position at any given time. If the aforementioned movable components are not in the proper position at any given time, the machine is either stopped or the operation thereof modified to appropriately correct the operation of the machine.

25 Claims, 7 Drawing Figures

OVERRIDE SYSTEM FOR GLASS FORMING MACHINERY

This is a continuation of application Ser. No. 898,213 filed Apr. 20, 1978 (abandoned upon the filing hereof).

BACKGROUND OF THE INVENTION

This invention relates to an automatic override system for modifying the operation of glass forming machinery.

The individual section or IS glass forming machine, which is well-known in the art, has a plurality of glass forming means integrated into a single plural section machine fed by a single source of molten glass. The sections are operated in synchronism in such relative phase relationship as to permit the several sections to acquire gobs in ordered sequence from a single gob feeder. Thus, as one of the sections is taking a gob from the gob feeder, another section is delivering a finished article to an output conveyor and other sections are engaged in various forming steps intermediate the taking of a gob and the production of the finished ware.

Further, it has been customary to provide two molds rather than one in each section of an individual section machine whereby a gob is received in a first mold called the blank or parison mold, for the initial process of forming a parison, followed by transfer of the parison to a second mold, called the blow mold, for final blowing of the article. By this means each section of the machine is operating simultaneously upon two work pieces. In order to control the operation of the various functional components of the glass forming machine, a means must be provided for actuating each of the elements in a preselected cyclic time format so that the operation of one element does not interfere with, but rather complements, the operation of the other components.

The several functional elements or components of the glass forming stations in the individual section machine are typically driven by pneumatic pressure which is controlled by an electronic timing circuit. An example of prior art controllers utilizing electronic timing means may be found in Quinn et al, U.S. Pat. No. 3,762,907 and Kwiatkowski et al, U.S. Pat. No. 3,969,703, both of which are assigned to the common assignee herewith. Other examples of prior art electronic controllers may be found in Croughwell, U.S. Pat. No. 3,905,793 and Mylchreest et al, U.S. Pat. No. 3,877,915. Each of these controllers typically includes a timing means for generating a machine cycle clock pulse train in synchronism with the operation of a machine being controlled, wherein the cycle clock pulses provide an instantaneous indication of the time elapsed in each cycle of operation of the machine. A storage unit such as a random access memory or a shift register stores the relative times in the machine cycles when each of the plurality of components of the machine are to be actuated. A comparator then compares the output of the pulse generator which indicates the time elapsed in each cycle with the stored values in the storage unit. When a comparison is made an actuating signal is generated for indicating that the functioning of the machine component is to be either started, stopped, or modified. To determine which machine component is to be actuated, an addressing means is provided which when enabled by the output of the comparator, selects the particular component which is to be actuated at that time in the machine cycle. A component operating command is then provided to the appropriate component to thereby control the operation thereof. These electronic controllers include systems for varying the time at which a particular machine component is to be actuated while the machine is operated. Further, these machines include systems for initiating a starting or stopping sequence at any time during the machine cycle so that once a starting or stopping sequence is initiated, the machine is controlled according to a preselected starting or stopping cycle so that the machine can be safely and efficiently turned on or shut down.

A drawback of the prior art is that if a particular machine component or the material being operated on, i.e., the molten glass or parison, is not in the proper position at any given time, expensive molding equipment can be damaged and production time lost. Further, when each individual section machine is being started up, the machine must be carefully monitored manually in order to insure that each component is in a proper operating position. This results in expensive manpower requirements.

Accordingly, it is an object of this invention to provide a glass forming machine having an automatic override system for continuously monitoring the glassware machine and for permitting correction of the position of the respective components of the machine if not in the proper operating position.

SHORT STATEMENT OF THE INVENTION

Accordingly, this invention relates to a glassware forming machine having a plurality of individual sections, each of which includes a plurality of movable components which operate in time relationship with respect to one another. A molten glass feeder feeds gobs of molten glass at a uniform rate from a predetermined location to each of the sections with the sections forming rigid glassware articles from the gobs, wherein each of the movable components are actuated at respective relative times in each of a plurality of machine cycles. The machine includes a timer for indicating the instantaneous time in each cycle of operation of the machine and a storage unit for storing the sequential relative times in a cycle of machine operation when each of the plurality of components are to be actuated. A comparator compares the instantaneous time elapsed in each cycle with the stored relative component actuated times to provide a signal for controlling the machine component whose component actuating time compared with the cycle time elapsed.

In the alternative, the storage unit can store the operational status of each of the components for each of a plurality of increments of time in a cyle. The stored status for each component is read during each increment of time during the machine cycle and the components are actuated, or left in their currect state depending on the stored status of each component from the storage unit.

A counter means is provided for selectively varying the actuating times of selected components stored in the storage unit while the machine is operated to thereby change the relative times in each machine cycle when the selected components are to be actuated. In addition, circuitry is provided for initiating a machine starting or stopping sequence at any time during the machine cycle so that the machine is started or stopped in a predetermined desired sequence.

A system monitor which comprises a detecting means, such as, a T.V. camera, for each individual section generates signals for indicating the relative position of each of the movable components of the machine. These signals are compared with stored signals which correspond to the desired position of the machine components at any given time during a machine cycle. Thus, during each machine cycle a comparison is made to determine whether the machine components are in the proper position. If a component is not in the proper position a signal is generated for inhibiting the start of the machine or for initiating a stop sequence. In the alternative the generated signal can be used for advancing or retarding the component which is out of position to its proper position before the next operation of the component is initiated.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
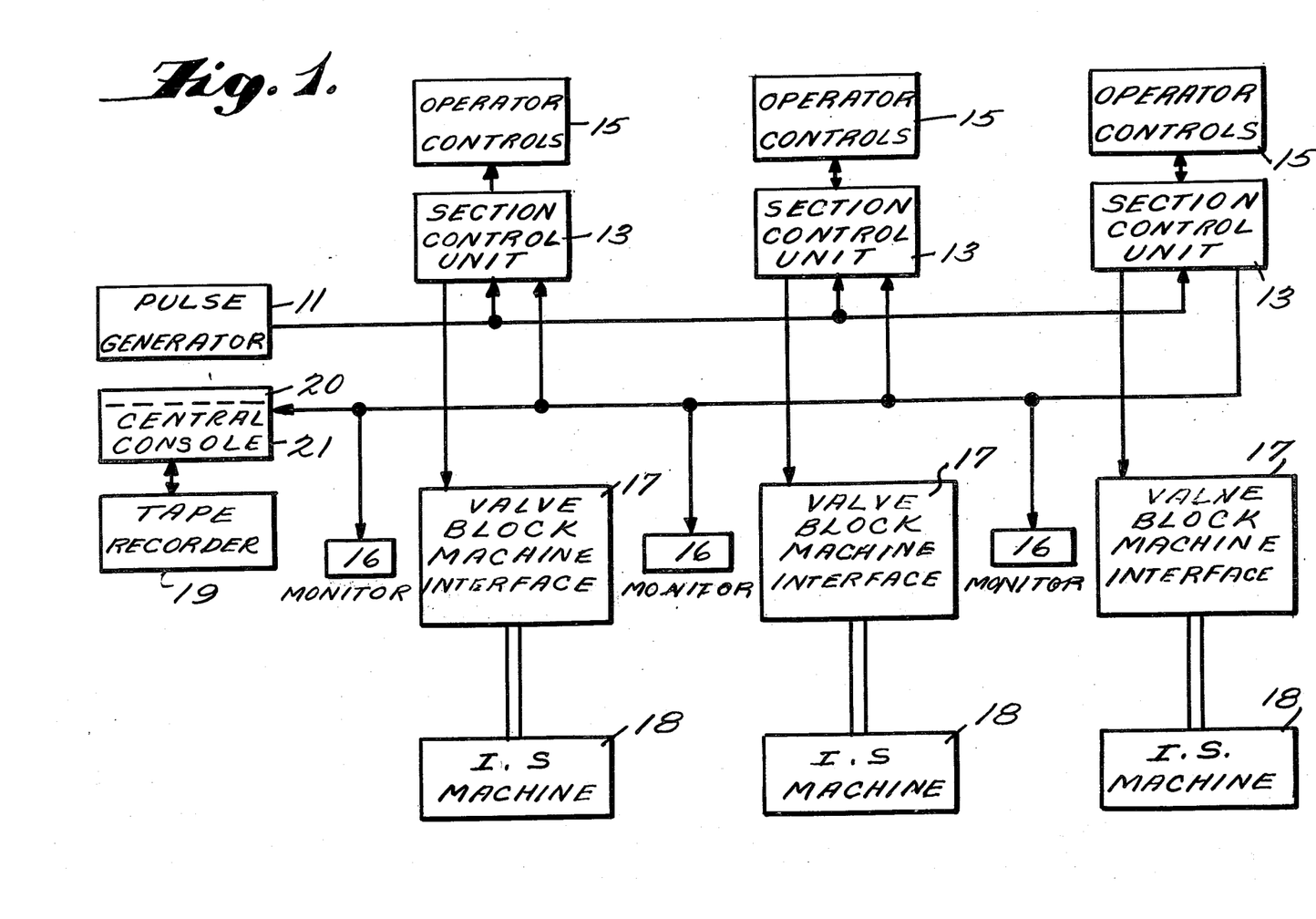
FIG. 1 is a block diagram of the control system for a glass forming machine of the present invention.

Refer now to FIG. 1 which is a schematic block diagram of the preferred control system for the glass forming machine of the present invention. A pulse generator 11 provides a train of cycle clock pulses having a frequency which is dependent upon the cycle time of the glassware forming machinery of the present invention. The generator also provides a reset pulse at the completion of each machine cycle. The pulse generator may operate on a time base in which case the machine cycle is divided up into a convenient number of clock pulse intervals or the generator may operate on a machine cycle base in which case 360 clock pulse intervals or a multiple thereof are provided per cycle. As an example, the pulse generator may include a conventional pulse generating means mounted on the drive shaft of the glass forming machine for generating two pulse trains. The first pulse train provides a cycle clock pulse for every degree of machine rotation and the second pulse train provides one pulse per machine revolution.

The output of a pulse generator is coupled to each of a plurality of individual machine section control units 13. Each section control unit preferably includes storage, comparing and addressing circuits which when arranged as described hereinbelow determines which elements of the machine being controlled are to be actuated at any given time. In addition, each section memory unit includes a counter for changing the relative time in a machine cycle when selected machine components are to be actuated. It should be understood, however, that each section control unit may include a storage unit for storing signals corresponding to the on/off or operational status of each of the machine components for each of a plurality of increments of time in each cycle of operation of the machine. These signals are read out during each increment of time and utilized to actuate, or maintain the present status of each of the machine components. This system of control is disclosed in greater detail in copending U.S. Patent application Ser. No. 898,212, filed Apr. 20, 1978 now U.S. Pat. No. 4,247,317 and assigned to the common assignee herewith. The subject matter of this application is incorporated herein by reference thereto.

The operator controls 15 include start and stop push-buttons for initiating a sequence of machine control commands for starting up or shutting down the machine being controlled. In addition, the operator controls include a degree display for instantaneously displaying the cycle time elapsed for a particular machine being operated. Finally, the operator controls include "sooner" and "later" push-buttons for controlling the counter in the section control unit 13 and a function select control for designating which operational element is having its timing changed by the counter. The operator controls are preferably positioned near the IS machine 18 being controlled so that the operation of the machine can be manually monitored if desired while the various control functions in the operator controls are being changed.

The output of each of the section control units 13 is coupled to an associated valve block machine interface 17 which provides the mechanical drive means for the machine 18 being controlled. If, for example, the machine being controlled is operated on a pneumatic basis, the valve block interface might include a number of valves which are controlled by solenoid actuators, the solenoid actuators being in turn controlled by the output of the section memory unit. A detailed description of the valve block machine interface will not be presented herein because actuators and valves for operating machine elements are known in the art.

A tape recorder 19 is provided which stores operational commands generated by a decimal keyboard. Thus, if the machines being controlled are to be operated in a number of different modes, each particular program mode may be stored on tape until it is utilized. The tape recorder 19 also stores the X-Y coordinates and the video levels of each machine component being monitored by the monitoring system 16 of the present invention. As will be seen hereinbelow, this information is utilized to override the normal program of operation of the glass forming machinery. The output of the tape is coupled to a micro-computer 20 of conventional design in a central console 21 which synchronizes the machines being controlled via the section control units so that if a plurality of machines are to be operated in a preselected time relationship with respect to one another, the central console insures that each of the section memory units are appropriately timed to operate in the preselected sequence. Further, the timing sequence in which the various components of the individual machines are to be operated is coupled from the central console to each of the associated control units. In addition, as each of the individual sections are operated under the control of their associated section control units 13, the section memory units provide an output to the central console verifying the order in which the respective components of the machine are actuated. This information may be stored in the tape recorder for future use.

Figure 2:
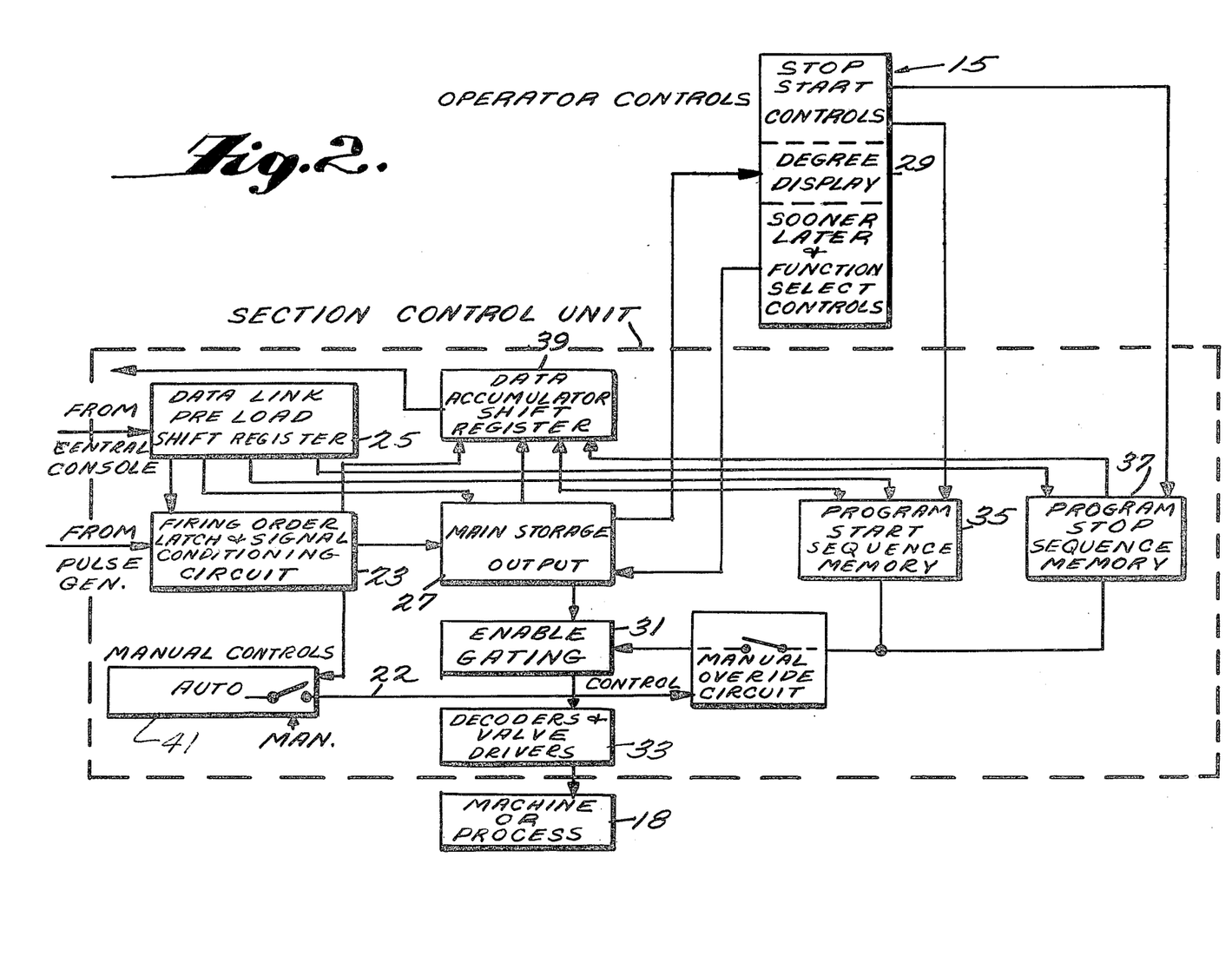
FIG. 2 is a more detailed functional block diagram of the control system of the glass forming machine of the present invention.

Refer now to FIG. 2 with respect to which a more detailed description will be given of the preferred section control memory units 13 and the preferred operator controls 15. The output of the pulse generator 11 is coupled to the firing order latch and signal conditioning circuit 23. The firing order and latch circuit is disclosed in greater detail in Kwiatkowski et al, U.S. Pat. No. 3,969,703, the subject matter of which is incorporated herein by reference thereto. The firing order latch circuit is controlled by means of a signal derived from a data link preload shift register 25. The input to the preload shift register is derived from the central console 21 and temporarily stores a timing command signal which instructs the firing order latch circuit 23 when to couple a reset pulse signal to the main storage memory unit 27. The clock pulse signals are coupled from the signal conditioning circuit to a comparator in the main storage unit 27 wherein the clock pulses which represent the time elapsed in a machine cycle are compared with component actuating times stored in a shift register or random access memory. The component actuating times stored in the main storage are coupled thereto via the data link preload shift register 25 which in turn derives the timing input information from the central console 21. The particular times at which the machine elements are to be actuated may be varied by the operator by appropriately pressing a "sooner" or "later" button in the operator control console 15. Thus, during the operation of the machine, by appropriately pushing either the "sooner" or the "later" button together with a function select control which selects the machine component whose cycle operating time is being changed, the manner of operating the machine can be readily varied. The main storage also provides signals for controlling the function degree display 29 in the operator control 15 which degree display displays the stored cycle operating degree of the selected function.

When a comparison is made in the main storage unit between the clock pulse timing input and a stored component actuating time signal, an output is provided to the enable gating circuit 31. The enabled gating circuit 31 provides an energizing signal to the decoder and valve drive circuit 33. The decoder circuit selects which component is to be actuated and hence which valve drive is to be energized. When the appropriate valve driver is energized, the associated machine component is actuated by either initiating or terminating its operation.

If the machine is initially shut down and it is desired to start up the machine, an appropriate starting signal is coupled to the program start sequence memory 35 from the start-stop control switches in the operator control 15. The particular starting sequence program is coupled to the start sequence memory 35 via the data link shift register 25 which in turn receives its input information from the central console 21. Thus, by appropriately typing into a storage circuit in the central console a preselected starting sequence, the sequence is coupled to the start sequence memory unit 35 which memory unit is actuated when the start button in the control 15 is pressed. As will be explained more fully hereinbelow, the output of the micro-programmer of the central console 21 can also be utilized to modify the starting sequence by aborting the start of the machinery or by varying the timing of operation of selected components, depending upon the condition of the various machine components during start-up. The output of the start memory sequence is coupled to the enable gating circuit 31 which in turn couples this signal to the decoder and valve driver circuit 33 for operating in a preselected manner the various components of the machine being controlled.

If it is desired to shut down the machine, the stop button in the operator control 15 is pressed to provide an appropriate signal to the stop sequence memory unit 17. The particular stop sequence utilized depends upon the type of machine being controlled and the appropriate commands are typed by means of a decimal keyboard into a memory unit in the central console 21. As with the case of the start sequence, the stop sequence can be modified depending upon the monitored condition of the movable components of the machinery. This will be explained more fully hereinbelow. If an immediate abort is desired, the override system provides a signal on line 22 for inhibiting gate 31.

The stop sequence information is coupled to the stop sequence memory unit 37 via the data link shift register 25. The stop sequence contol commands stored memory 37 are coupled from the stop sequence memory 37 to the enable gating circuit 31 and then to the decoder and valve drive circuit 33 for appropriately controlling the various machine components of the machine being controlled.

The operational sequences of the main storage memory and the firing order latch circuit are each coupled to a data accumulator shift register 39 which in turn couples the input information thereto in serial fashion back to the central console where this data may be recorded on tape for reply should the same machine cycle be again run.

Should it be desired that the machine be started or stopped on a manual basis, a manual switch 41 is closed. This enables the machine section firing order to be selected from a T.W.S. and overrides the program start and stop memories with hardwired circuitry for a simple start and stop procedure.

Figure 3:
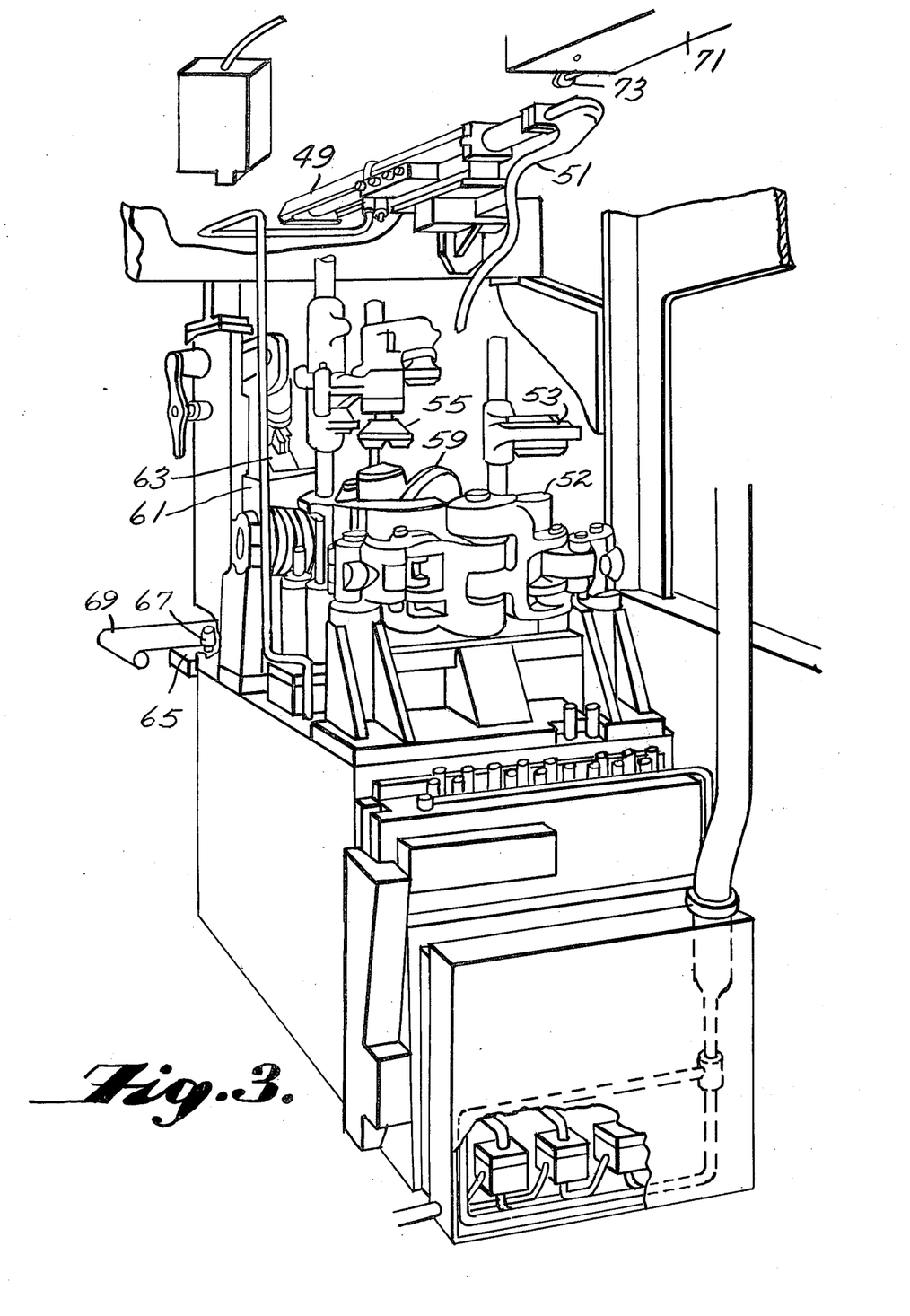
FIG. 3 is a perspective view, with portions being broken away for clarity, of one section of the glass forming machine.

Referring now to FIG. 3, an individual section of an exemplary glass forming machine of the individual section type is shown in perspective, with portions broken away for clarity. It is to be understood that the glass forming machine as shown, however, is merely representative of the type of machine to which the present invention is applicable, since the particular details of the forming machine and the control system adapted thereto may be varied to suit the needs of a given installation. For example, the glassware forming machine to which reference is made herein is known as a blow-and-blow machine, whereas the invention is equally applicable to a press-and-blow machine.

Glass forming machines, generally, and individual section machines, in particular, are well known to those skilled in the art, and no detailed description of the structure or operation thereof is necessary in a disclosure of the present invention. However, irrespective of the particular type of glass forming machine contemplated, certain basic elements are present, and a brief description of such elements, their operation and their relationship to a few of the elements peculiar to the blow-and-blow machine is in order to gain a clearer perspective of the invention.

As illustrated in FIG. 3, one of the sections 18 of a blow-and-blow machine is shown from the back side or blank mold side displaying such elements as scoop 49, delivery means 51 and both funnel 53 and baffle 55 as associated with blank mold 52. A transfer or invert mechanism 59 is positioned intermediate the front and back sides of the machine for inverting the parison formed in the blank mold 52 while transferring it to a blow mold 61 at the front of the section. A suitable takeout mechanism 63 is positioned near blow mold 61 for removal of the hot finished ware therefrom and transfered to a corresponding dead plate 65. Also, on the front side of the machine is pushout or pusher arm 67 for delivering the ware from the dead plate 65 to conveyor means 69, which, as stated above, will normally serve to transport the ware for further processing, as, for example, to a suitable lehr (not shown) for annealing and subsequent cooling and any other desired treatment (such as a lubricant coating).

It will be understood, as stated above, that the machine illustrated in FIG. 3 is but one section of a plural-section machine. In the embodiment of the invention to be described herein, the overall machine will comprise a plurality of sections, each being fed a gob of molten glass in ordered sequence from single-feeding means 71, which constitutes a portion of a suitable source of molten glass, such source usually including means for weighing and mixing the several dry ingredients and means for delivering batches of such mix to a furnace, in which the mix is converted to a molten mass and maintained at a desired temperature for delivery to a feeding means, such as feeding means 71. The continuous flow molten glass from feeding means 71 is interrupted by a shear means 73, which cuts the molten glass into individual gobs for delivery to the several sections of the machine in sequence.

It is customary to employ pneumatic pressure as the motive force for actuating each of the plurality of moving elements of the individual section machine, and the control system of the present invention, being well suited to pneumatic actuation, actuates a plurality of pneumatic valves in a desired sequence for applying pneumatic pressure selectively to a corresponding plurality of pneumatic actuators (such as piston-cylinder assemblies) which serve as the respective motive means for the several moving elements of the machine. However, it should be understood that the present invention is not limited to pneumatic drive means and instead, for example, motor or solenoid drives could be used.

Figure 4:
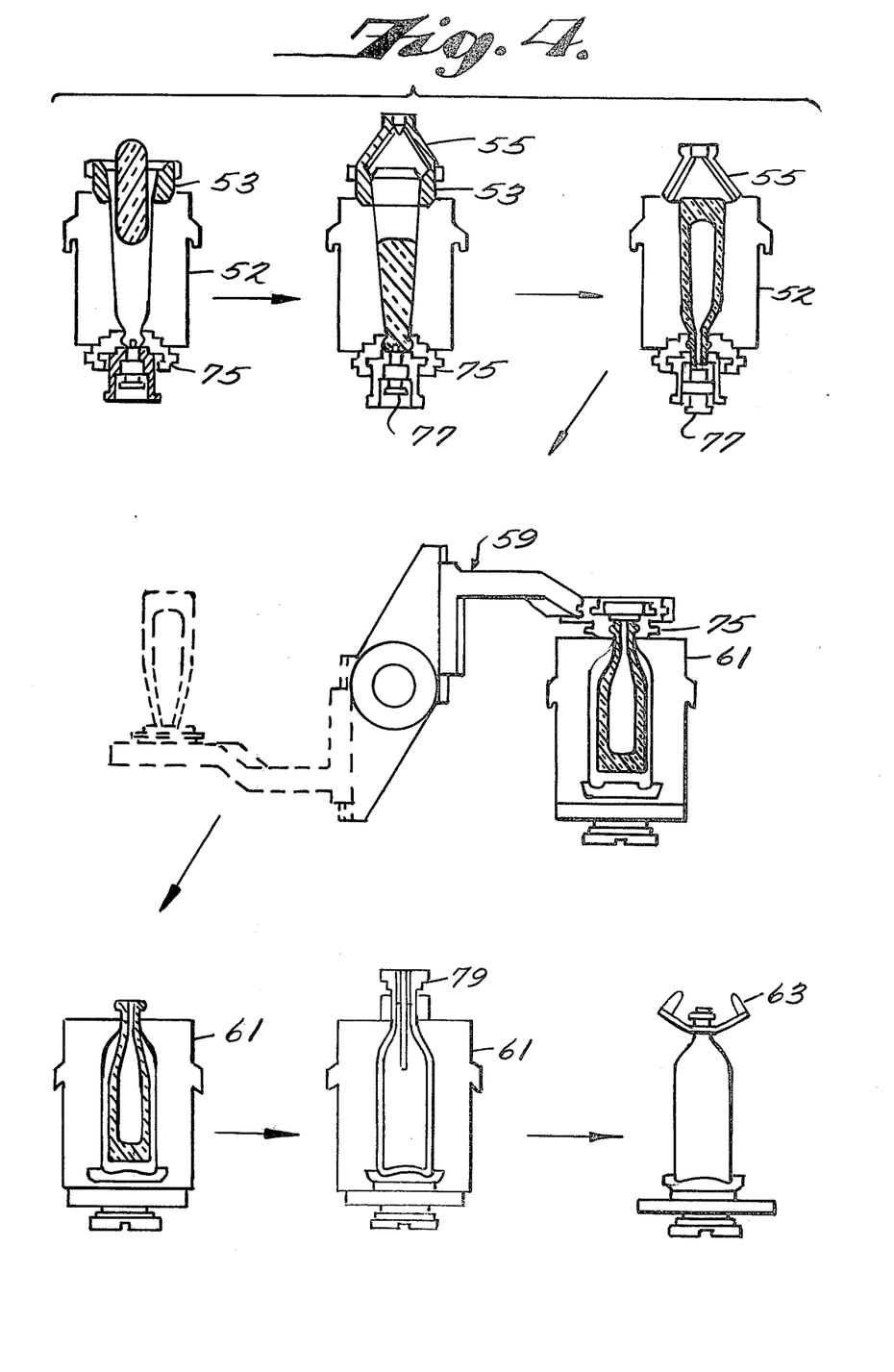
FIG. 4 is a schematic representation of the sequence of events occurring in one section of a typical individual section machine.

The machine elements have been shown, at least generally, in connection with the description of FIG. 3, but the interrelated operation thereof will be more fully appreciated and understood in connection with a combined description of FIGS. 1, 3 and 4, the latter showing schematically the sequence of events in one section of a blow-and-blow machine.

First, the continuous flow of molten glass from the feeder 71 is repetitively severed at a predetermined rate by means of shears 73 to separate the flow into a series of gobs. As each section of the machine acquires a gob in sequence, the gob falls from the shears 73 and is carried by the delivery means 51 (including a scoop, trough and deflector) to the blank mold 52, over which the funnel 53 is positioned in order to guide the gob into the mold. Thus, as is indicated in the first step in the sequence illustrated in FIG. 4, the gob falls through funnel 53 into the interior of the mold. As a second step, the baffle 55 is positioned over the funnel 53 and air discharged into the mold through baffle 55 forces the molten glass into the neckring 75 and around the plunger 77, in a step referred to as settle-blow. The third step illustrated in FIG. 4 shows the funnel 53 removed and baffle 55 in place on top of the blank mold, with plunger 77 retracted. Counterblow air now is introduced into the depression left in the glass by the plunger, causing the glass to fill the blank, forming a parison.

During this counterblow step, the third step in FIG. 4, the body of the blank mold extracts heat from the parison sufficiently to form a cooled skin thereon which is sufficiently rigid to permit manipulation of the parison by a transfer mechanism which carries the parison to the blow mold 61 on the front side of the machine. This transfer of the parison from blank to blow mold is illustrated as the fourth step in FIG. 4, wherein the pivotal transfer mechanism 59 removes the parison from between the opened halves of the split blank mold and places it between the closing halves of the blow mold, having inverted the parison in the process, so that it is now in an upright position, with the mouth at the top, and supported by the neckring 75.

Subsequent to the invert step, the neckring halves are separated, so that the parison is left hanging by the now-closed halves of the blow mold. In this position, the reheat step takes place, in which the cooler skin of the glass is reheated by the relatively hot interior glass, and the parison then becomes sufficiently soft for final blowing.

In the final blowing, indicated in step 6 of FIG. 4, blowhead 79 is positioned over the blow mold 61, and blow air is forced into the soft parison, causing it to fill the blow mold and take the shape thereof, i.e., the shape of the desired finished ware. Here again, heat is absorbed by the mold walls, cooling the glass to render it sufficiently stiff for handling.

In the last step shown in FIG. 4, the split halves of the blow mold have parted, and the tongs of the takeout mechanism 63 grip the ware at the neck and transfer it to the dead plate, for further cooling and pushout to the conveyor.

As is obvious, the timing of the movements of all of the foregoing glass forming elements is critical, and each element must be moved with precision not only to perform its function in the overall process, but to prevent collisions betweenn elements, whereby one faulty element would prevent other elements from performing their tasks. For example, if the scoop for a given section fails to retract in time from a position under the shears, the scoops of other sections will be jammed in attempting to acquire gobs. If the blank mold fails to open properly, the next gob will fall on top of the blank. If the funnel is not positioned over the blank at the proper time, the gob might fail to enter the blank. Should the baffle fail to come down as needed, the parison would be misformed. If either the funnel or the baffle failed to leave the top of the blank after parison formation, the transfer arm would then collide with the faulty element on attempting invert. If the plunger fails to rise or retract as required, faulty parison formation follows. Should the transfer arm fail to revert, remaining in a position over the blow mold, the blowhead would be prevented from being seated atop the blow mold as required for final forming. Were the blowhead not to retract after final forming, a collision would occur with the takeout mechanism, as well as with the transfer arm on the next invert. Malformation of the ware results from failure of the blow mold to close and open properly, as well as from a failure of final blow. Should the takeout mechanism fail to retrieve a finished ware, the next subsequent parison will be jammed down on top of the previously finished piece. Where the neckring fails to open after invert, the parison will remain in the neckring and on revert will be placed back in the blow mold.

The foregoing tabulation of operating failures, tedious as it is, is only a partial listing of the faults that may occur in each section of an individual section machine. Accordingly, it can readily be seen that it is essential that accuracy and facility of control is essential to the sunchronous operation of the many elements of each section of the machine as well as with respect to the timing of gob acquisition and finished ware delivery in the related control of the severed sections. It is an important feature of the present invention that the operation of each of the movable components as well as the timing of gob acquisition and maneuvering the monitored and controlled. Thus, the present invention automatically provides a system for correcting inaccurate or faulty operation of the components of each individual section machine as well as providing a means for aborting a start-up or initiating a shut-down of the machine should a serious misoperation occur.

Figure 5:
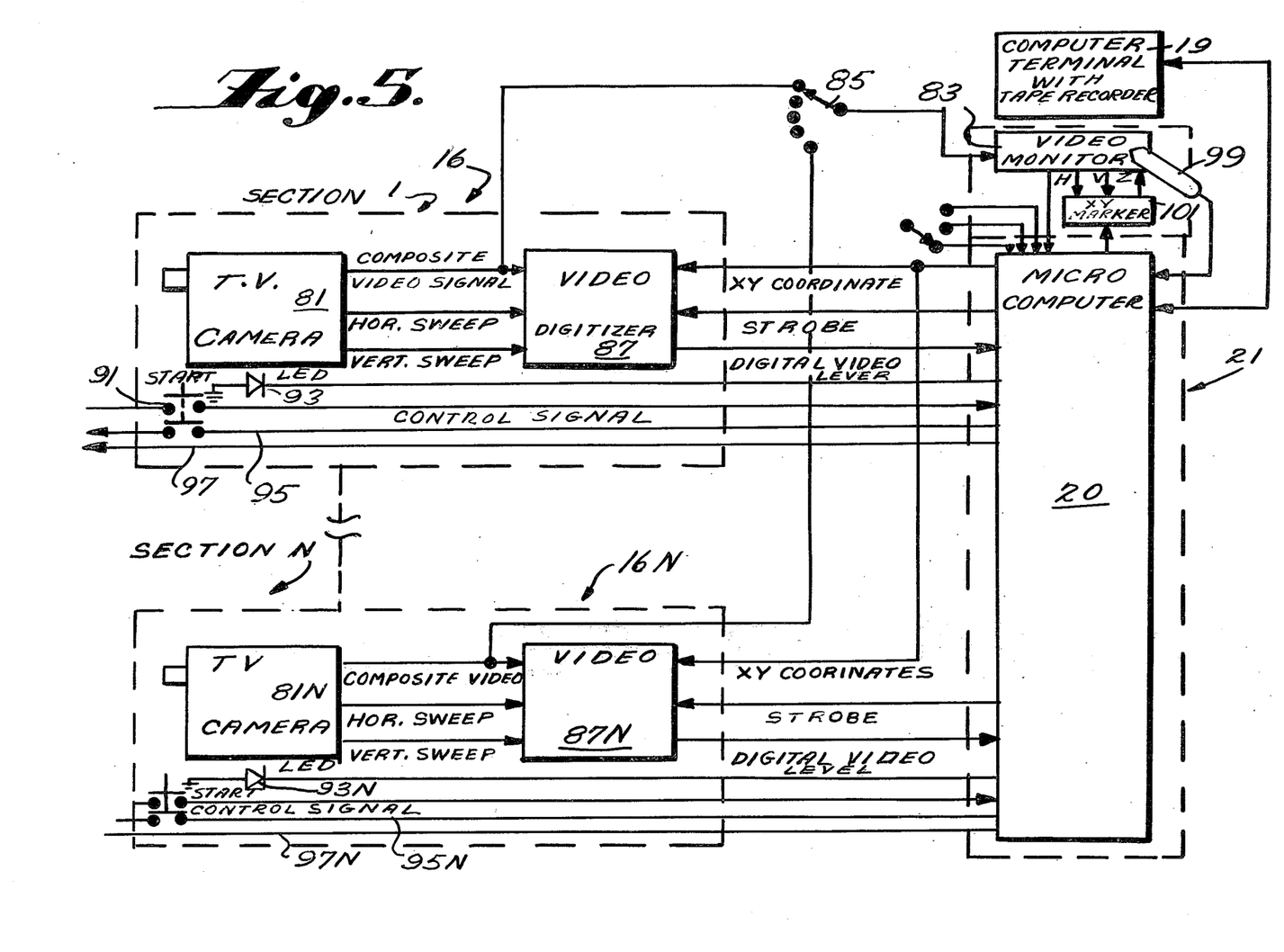
FIG. 5 is a schematic block diagram of the automatic override system of the present invention.

Refer now to FIG. 5, which is a schematic illustration of the automatic override system of the present invention. As illustrated, a monitor 16-16N is associated with each of the H individual sections of the glass forming machine. With specific reference to section 1 of the machine, a monitoring device which in the preferred embodiment is a T.V. camera 81, is mounted in position to view each of the movable components illustrated in FIG. 3. The composite video signal derived from the T.V. camera is coupled directly to a video monitor 83, by means of a selector switch 85, and in addition is coupled to a local video digitizer 87. The horizontal sweep and vertical sweep signals generated in the T.V. camera 81 are also coupled to the local video digitizer 87 as separate signals. Also coupled to the digitizer 87 are X-Y coordinate signals and a strobe signal generated by micro-computer 20. Micro-computer 20 may be of any type conventionally known in the art, such as, for example, a PDP 1103 manufactured by Digital Manufacturing Corporation.

The local video digitizer 87 converts the composite analog video signal from the T.V. camera to a digital signal having values which correspond to each X-Y coordinate coupled to the digitizer from the microcomputer 20. The X-Y coordinate signals and the digitized video level signal are each stored in the microcomputer 20 for use during the operation of the monitoring system.

Also electrically connected to the input of the micro-computer 20 is a "start" pushbutton 91 which enables the monitoring system for the first IS machine. As an output of the micro-computer 20, when an override command occurs, a signal is coupled to a light emitting diode or other such indicating means 93 for visually indicating that the override system is in operation and that the normal program sequence for the IS section is being overridden. Also connected to the output of the micro-computer 20 is the section control line 95, which is connected to the enabling gate 31, illustrated in FIG. 2, for inhibiting the gate if a start is to be aborted. A second signal control line 97 is connected to the data link preload shift register 25 of FIG. 2 for coupling thereto a new sequence of instructions for controlling either the main storage 27, the program start sequence memory 35 or the program stop sequence memory 37, in accordance with a routine which depends upon the relative positions of the various components of the IS machine with respect to where these components should be at any given time.

As aforementioned, the composite video signal from the camera 81 is coupled to the video monitor so that the video monitor displays a picture of the movable components of the IS machine. During set-up of the system, X-Y coordinates are assigned to each component part of the IS machine. To do this, the light pen 99 is placed upon the video monitor at each location of the parts to be monitored. The light pen detects the level of light at each location and this information in addition to the time information which defines the X-Y coordinate of the components is coupled to the micro-computer 20. The micro-computer 20 then prints out, records on a cassette tape and/or stores in its internal memory the corresponding X-Y coordinates and video levels of each of the components selected by the light pen. This procedure is repeated for each moving part of the IS machine to be monitored.

If the machine components are to be monitored for a plurality of time increments during a machine cycle, the video level signal from the light pen 99 and the X-Y coordinates of the various machine components for each increment must be determined and stored. After each of the coordinates and video levels are recorded on the cassette tape and/or stored in the micro-computer 20, it is only necessary to play back the tape or address the storage in the micro-computer to effect operation of the system. The stored X-Y coordinates for each of the components are then sent to the X-Y marker circuit 101 which will be described more fully in connection with FIG. 7. The X-Y marker modulates the video monitor's Z axis signal to thereby cause a bright spot to appear on the picture tube at each of the selected X-Y coordinates to thereby provide a visual indication of all monitored points on the picture at start-up and if desired at each increment in the machine cycle when monitoring occurs.

After the set-up has been completed, a command is given to the micro-computer to initiate monitoring by appropriately depressing the start button 91. The micro-computer, in the meantime, internally scans the "start" pushbuttons of all of the IS sections, and when a "start" button has been detected as being depressed, the micro-computer sends a first X-Y coordinate to the video digitizer 87. The micro-computer then compares the digitized video level signal from the video digitizer 87 with the reference value which was stored during the set-up procedure. The next X-Y coordinate for the component being monitored is then sent to the video digitizer 87. This sequence is repeated until all of the video levels of the component being monitored have been compared against the stored reference values. A simplified weighting algorithm is used in the comparison process to allow for small variations in the video levels dependent upon the ambient light conditions in the environment of the IS machine. Utilizing a majority test rule, if the majority of reference values do not compare, the operator is signalled by the light emitting diode 93, that the machine section components are not correctly positioned. At this time the micro-computer makes a decision as to whether start-up of the IS machine should be aborted or whether modifications in the sequence of operation of the respective machine components should be varied. Depending upon the decision made by the micro-computer, a signal is provided on line 95 to abort start or on line 97 to modify the sequential operation of the machine components. The routines for the weighting and majority test algorithms are easily prepared using ordinary programming techniques and accordingly are not described herein in detail. It should be understood, however, that other tests can be applied other than to majority test rule to determine whether one or more of the movable components are accurately and correctly positioned.

On the other hand, if the majority of the reference values compare with the video levels presently being detected, then the X-Y coordinate positions for the next component are compared and tested in the same manner. When each of the components of the IS machine have passed the majority rule test, the IS machine is run in accordance with the normal program initially written into the main storage 27, start sequence memory 35 and stop sequence memory 37.

This process is repeated in an interleaved sequential manner for each of the plurality of N sections of the glass forming machine, so that each of the individual sections of the glass forming machine are continuously monitored by the system of the present invention.

In addition, this process, if desired, is repeated for each of a plurality of time increments in the machine cycle so that during any given cycle time the position of the IS machine components are monitored and corrected or machine operation aborted. Depending upon the time in the cycle and the component which is not in place, the micro-computer describes what routine or sequence of shut-down or component position modification will be followed. These various shut-down routines or component position changes routines can be stored on tape or other suitable memory unit. The routines are coupled to program step sequence memory 37 or the main storage memory 27 via the data link preload shift register 25 illustration in FIG. 2.

Figure 6:
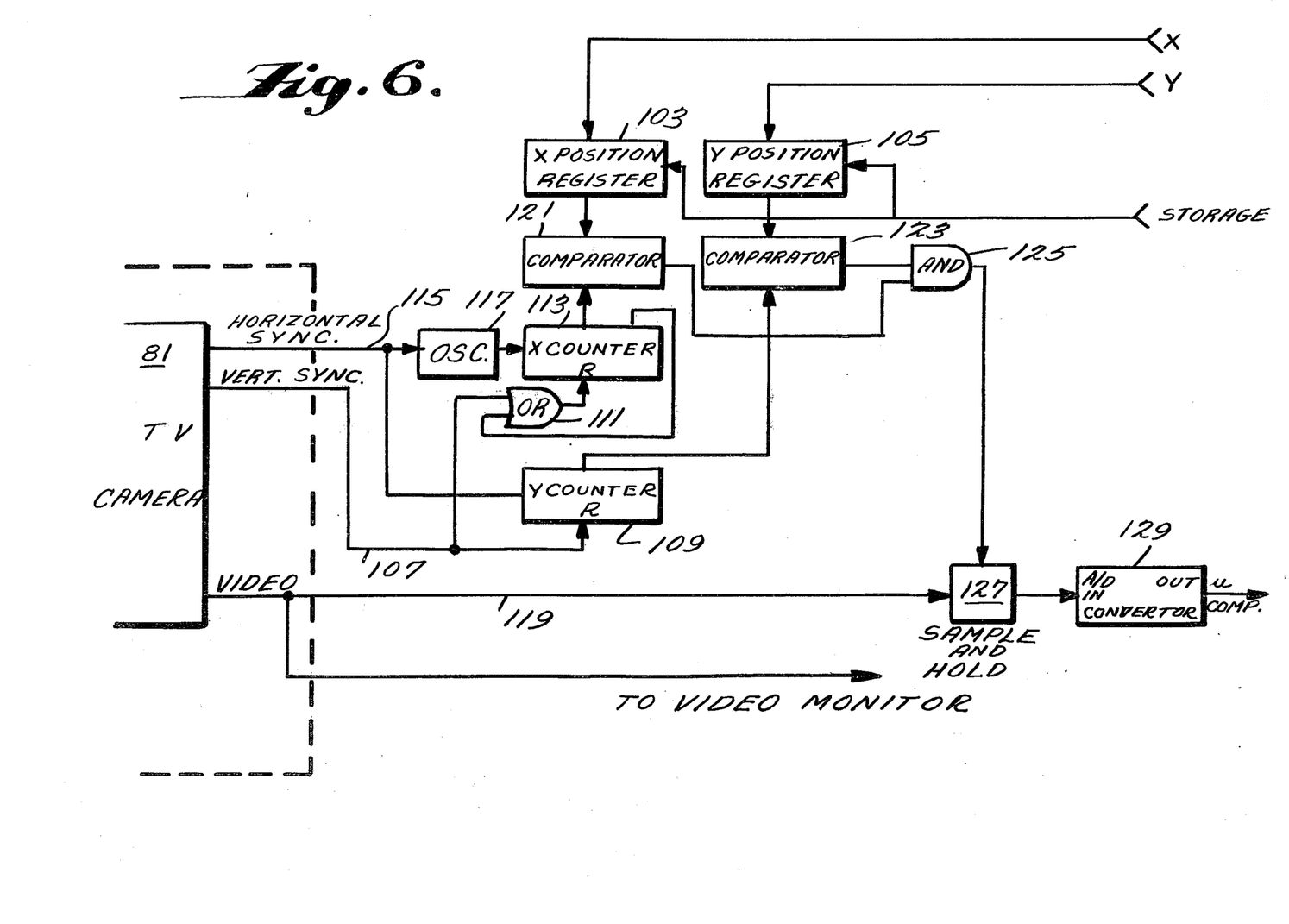
FIG. 6 is a schematic block diagram of the video digitizer of FIG. 5.

Refer now to FIG. 6 which is a more detailed schematic illustration of the local video digitizer 87 illustrated in FIG. 5. As aforementioned, the function of the local video digitizer 87 is to convert the composite video signal level at each selected X-Y coordinate specified by the micro-computer 20, to a digital binary representation thereof. In order to accomplish this, the micro-computer sends both the X and Y coordinate digital signals of the X-Y coordinate being monitored to the X position register 103 and the Y position register 105, respectively. These registers may be, for example, serial to parallel shift registers for temporarily storing the values of the X and Y coordinates coupled thereto. At the same time the vertical retrace signal from the T.V. camera 81 is coupled on line 107 to the Y counter 109 and to the OR gate 111. This vertical retrace signal is utilized to reset Y counter 109 and the X counter 113. At the same time the horizontal sweep signal on line 115 triggers an oscillator 117, which increments the X counter 113, 256 counts for each horizontal sweep, i.e., each horizontal scan is divided into 256 X coordinate increments. The number 256 is arbitrarily selected for the number of X axis increments since for each vertical sync interval there are 256 horizontal sweeps. Hence, the vertical axis is divided into 256 increments, the same as the X axis. At the end of each horizontal scan, i.e., after a count of 256, counter 113 generates a reset pulse which is coupled via OR gate 111 to the recent input of counter 113 to reset the counter. At the same time, the Y counter 109 is incremented one count. Thus, in effect, counter 113 and counter 109 represent, respectively, the X coordinate and the Y coordinate of the instantaneous video composite signal on line 119. Digital comparators 121 and 123 each compare the count in the X counter 113 and Y counter 109, respectively, with the stored X coordinate in register 103 and Y register 105, respectively. When a comparison exists in both comparators 121 and 123, AND gate 125 is enabled and provides a trigger signal to a sample-and-hold circuit 127 of conventional design. The sample-and-hold circuit samples the analog video signal on line 119 and holds that voltage level for the analog-to-digital converter 129. Analog-to-digital converter 129 may be of any type conventionally known in the art and converts the value of the signal stored in the sample-and-hold circuit 127 to a binary digital signal which is coupled to the micro-computer 20. The binary digital signal coupled to the micro-computer represents the video signal level at the particular X-Y coordinate stored in the X and Y registers 105 and 103, respectively.

Figure 7:
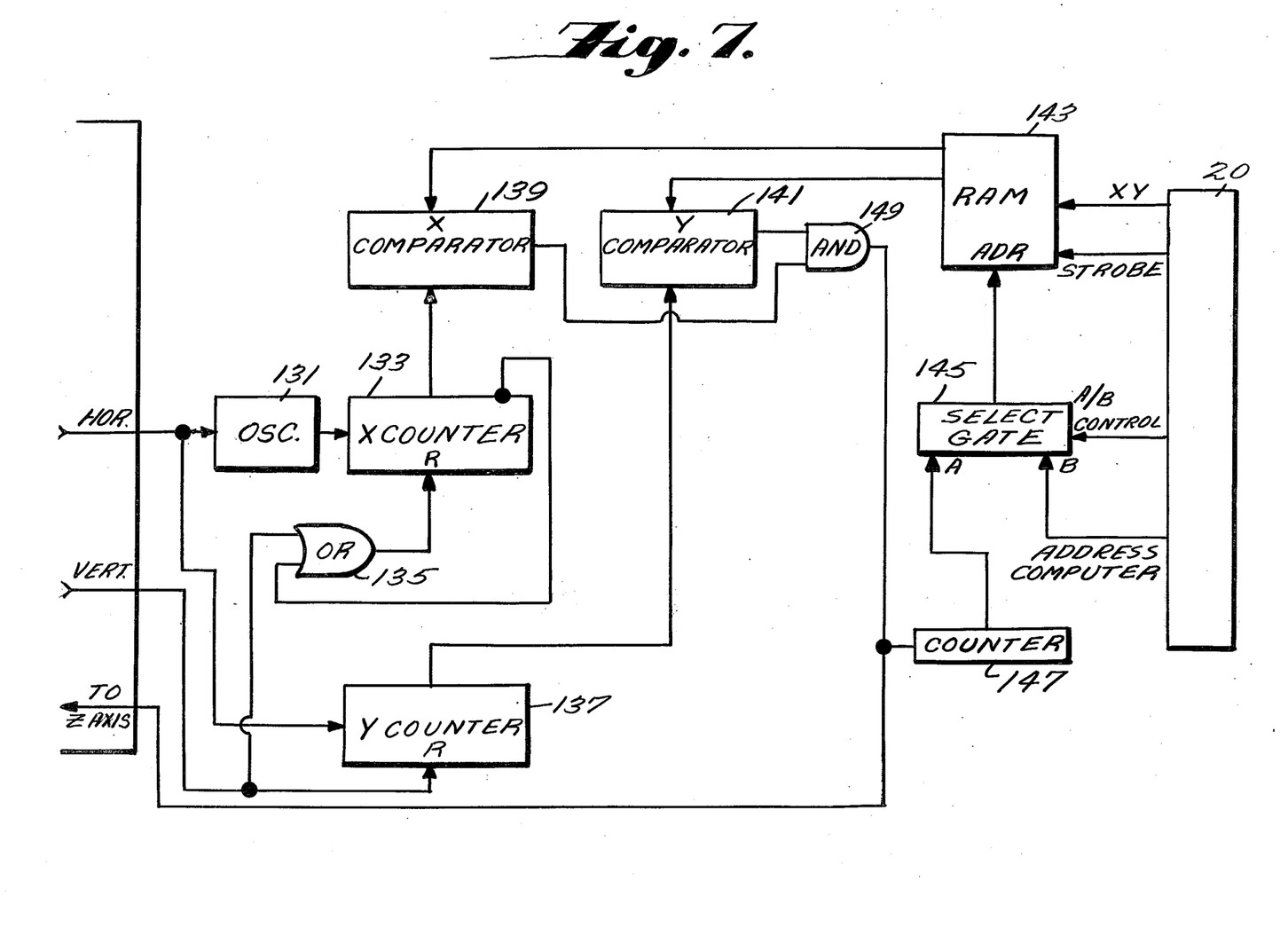
FIG. 7 is a schematic block diagram of the X-Y marker of the automatic override system of FIG. 5.

Refer now to FIG. 7, which is a more detailed schematic illustration of the X-Y marker of FIG. 5. The purpose of the X-Y marker is to provide a bright spot at each location on the video monitor which corresponds to the X-Y coordinate of a machine component being monitored. To achieve this, as the video monitor, which for example, may be a conventional cathode ray tube, adapted to receive T.V. signals, generates horizontal and vertical sweep signals for driving an electron beam across the face of the scope, the horizontal sync signal from the video monitor 83 is coupled to oscillator 131, which, for example, may be of the same type as oscillator 117, in the video digitizer. Thus, oscillator 131 generates 256 output pulses for each horizontal sync signal, which pulses are coupled to X counter 133. After the X counter 133 counts to 256, a reset pulse is generated and coupled via OR gate 135 to the reset input of the X counter 133. The horizontal sync signal is also coupled to the Y counter 137. At the end of each horizontal scan, the Y counter 137 is incremented one count. At the end of a vertical sweep, the vertical sync pulse is coupled to the reset input of the Y counter 137 and the reset input of X counter 133 to reset each of these counters. The output of counter 133 is coupled to digital comparator 139, while the output of Y counter 137 is coupled to a second digital comparator 141.

Each of the respective X and Y coordinates to be displayed on the video monitor 83 is coupled to a random access memory unit 143 of conventional design known in the art. These signals are stored in predetermined locations in the memory 143 and read out to the digital comparators 139 and 141, in accordance with an address signal coupled thereto by the select gate 145. The select gate selects the addresses of the X-Y coordinates stored in the RAM 143 in a sequence which depends upon whether the A or the B address mode is being utilized. The selection of the A or B address mode is derived from the micro-computer 20 dependent upon the particular sequence in which the various movable components of the IS machines are to be controlled. If, for example, the X-Y coordinates from the micro-computer are read in the RAM 143, in the sequence in which they would normally be actuated or deactuated, counter 147 controls the sequence in which the respective stored X-Y coordinates are read out of the RAM 143 and into the comparators 139 and 141. On the other hand, if only certain components are to be actuated or deactuated in a sequence which is not normally used in order to re-position one or more of the machine components, an address sequence generated by the micro-computer is coupled to the RAM 143 via input B of select gate 145. Thus, the sequence of X-Y coordinates selected by the micro-computer are read out of the RAM 143 and into the comparators 139 and 141.

When comparisons exist in comparators 139 and 141, output signals are generated which enable AND gate 149. The output of AND gate 149 increments the counter 147 and at the same time generates a brightness signal on the Z axis line 141 for displaying on the video monitor 183 a bright spoot at the particular X-Y coordinate selected.

It should be understood that a monitoring device other than a T.V. camera, such as, for example, a photocell array could be used in keeping with the present invention. In addition, if desired, only start-up conditions can be monitored such that start-up is overridden if each movable component is not in its proper position as start-up. However, the present invention also contemplates monitoring the individual machine sections at a plurality of times during each machine cycle causing one or more sections to be shut down if the machine components are not in the proper position at any given time. Further, the present invention contemplates modifying machine component timing should the machine components not be in proper position at any given time in the machine cycle. As aforementioned, this is accomplished in accordance with a predetermined routine stored on tape or other memory and selected by the micro-computer 20 depending upon the component that is not in proper position and the time in the cycle when the error in component position is detected.

While the present invention has been disclosed in connection with the preferred embodiment thereof, it should be understood that there may be other obvious modifications of the present invention which fall within the spirit and scope of the appended claims.

What is claimed is:

1. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a controller for said glassware forming machine comprising: timing means for generating a digital signal, said digital signal providing an indication of the time elapsed in each cycle of operation of said machine,
   means responsive to said timing means for generating component operation commands for at least one movable component of a section during the machine cycle,
   means for continuously monitoring the change in position of at least one of said components of said section of said glassware forming machine,
   means responsive to said monitoring means for determining if said at least one monitored component is in the correct position during at least one portion of the cyclic operation of said section, and
   means responsive to said determining means for inhibiting the operation of said machine if at least one of said monitored components is not in the correct position.

2. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a controller for said glassware forming machine comprising:
   timing means for generating a digital signal, said digital signal providing an indication of the time elapsed in each cycle of operation of said machine,
   means responsive to said timing means for generating component operation commands for at least one movable component of a section during the machine cycle,
   means for continuously monitoring the change in position of at least one of said movable components of said section of said glassware forming machine,
   means responsive to said monitoring means for determining if said at least one monitored component is in the correct position, and
   means responsive to said determining means for initiating a machine stopping sequence at any time during a machine cycle if at least one of said monitored components is not in the correct position during said cycle.

3. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a controller for said glassware forming machine comprising:
   timing means for generating a digital signal, said digital signal providing an indication of the time elapsed in each cycle of operation of said machine,
   means responsive to said timing means for generating component operation commands for at least one movable component of a section during the machine cycle,
   means for continuously monitoring the change of position at least one of the movable components of said section of said machine,
   means responsive to said monitoring means for generating a signal representing the location of said at least one movable component at each of a plurality of time intervals in said machine cycle,
   means for storing the correct machine component location of said at least one movable component for each of said plurality of time intervals of said machine cycle,
   means for comparing said generated signal representing the location of said at least one movable component with said stored correct machine component location at each time interval, and
   means for generating a fault signal if said at least one movable component is in an incorrect position.

4. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a controller for said glassware forming machine comprising:

timing means for generating a digital signal, said digital signal providing an indication of the time elapsed in each cycle of operation of said machine, means responsive to said timing means for generating component operation commands for at least one movable component of a section at each of a plurality of times in the machine cycle, means for continuously monitoring the change of position of at least one of said movable components of said section of said glassware forming machine, means responsive to said monitoring means for determining if said at least one monitored component is in the correct position during at least one portion of the cyclic operation of said section, and means responsive to said determining means for varying the actuating time of said at least one monitored component, if said at least one component is not in the correct position, to thereby move said component into the correct position.

5. In a glassware forming machine having a plurality of sections each of which includes a plurality of moving components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a controller for said glassware forming machine comprising:

timing means for generating a digital signal, said digital signal providing an indication of the time elapsed in each cycle of operation of said machine, means responsive to said timing means for generating component operation commands for at least one movable component of a section at least one time in the machine cycle, means for continuously monitoring the change of position of at least one of said movable components of said section of said glassware forming machine, means responsive to said monitoring means for determining if said at least one monitored component is in the correct position, and means responsive to said determining means for generating a stopping sequence at any time during a machine cycle if said at least one monitored component is not in a correct position at any time during said cycle.

6. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a controller for said glassware forming machine comprising:

timing means for generating a signal, said signal providing an indication of the time elapsed in each cycle of operation of said machine, means responsive to said timing means for generating component operation commands for the movable components of a machine section at each of a plurality of times in the machine cycle, means for continuously monitoring the change of position of at least one of said movable components of said section of said glassware forming machine, means responsive to said monitoring means for determining if said at least one monitored component in each section of said machine is in a correct position during at least one portion of the cyclic operation of said section, and means responsive to said determining means for inhibiting the operation of said machine if said at least one monitored component in each section is not in a correct position.

7. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherin said movable components are each actuated at respective relative times in each of a plurality of machine cycles, a controller for said glassware forming machine comprising:

timing means for generating a signal indicative of the time elapsed in each cycle of operation of said machine, means responsive to said timing means for generating component operation commands for the movable components of a section at each of a plurality of times in a machine cycle, means for continuously monitoring the change of position of each of the movable components of said machine, means responsive to said monitoring means for generating a signal representing the location of each of said movable components, means for storing the correct machine component location for each movable component, means for comparing said generated signal representing the location of each of said movable components with the corresponding stored correct machine component location, and means for generating a fault signal if at least one of said movable components is in an incorrect position.

8. The controller of claim 7 further comprising means for shutting down said glassware forming machine when at least a selected one of said movable components is in an incorrect position.

9. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a controller for said glassware forming machine comprising:

timing means for generating a signal indicative of the time elapsed in each cycle of operation of said machine, means responsive to said timing means for generating component operation commands for the movable components of a section at each of a plurality of times in a machine cycle, means for continuously monitoring the change of position of each of the movable components of said machine, means responsive to said monitoring means for generating at each of a plurality of time intervals a signal representing the location of each of said movable components, means for storing the correct machine component location for each movable component at each of said plurality of time intervals, means for comparing said generated signal representing the location of each of said movable components with the corresponding stored correct machine component location at each of said plurality of time intervals, and means for generating a false signal if at least one of said movable components is in an incorrect position.

10. The controller of claim 9 further comprising means for shutting down said glassware forming machine when at least a selected one of said movable components is in an incorrect position.

11. The glassware forming machine of claim 9 further comprising means for changing the operation of said machine when at least a selected one of said movable components is not in a predetermined position.

12. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a controller means for indicating the machine cycle position, for said glassware forming machine comprising:

timing means for generating a synchronization signal, said signal providing an indication of the time elapsed in each cycle of operation of said machine, a storage means for storing signals corresponding to the relative times in a cycle of machine operation when each of the plurality of components is to be actuated, means for reading out the contents of said storage means, comparator means responsive to said timing means and said readout means for comparing the times elapsed in each cycle with the relative component actuating times stored in said storage means, said comparator providing an actuating signal when a favorable comparison results, means responsive to said actuating signal for providing a component operating command to the component whose component actuating time compared with the cycle time elapsed, means for continuously monitoring the change of position of at least one of said movable components of at least one section of said glassware forming machine, and means responsive to said monitoring means for changing the operation of said machine when a movable component is not in a predetermined position.

13. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a controller for said glassware forming machine comprising:

timing means for generating a signal indicative, said signal providing an of the time elapsed in each cycle of operation of said machine, a storage means for storing signals corresponding to the relative times in a cycle of machine operative when each of the plurality of components is to be actuated, means for reading out the contents of said storage means, comparator means responsive to said timing means and said readout means for comparing the times elapsed in each cycle with the relative component actuating times stored in said storage means, said comparator providing an actuating signal when a favorable comparison results, means responsive to said actuating signal for providing a component operating command to the component whose component actuating time compared with the cycle time elapsed, means for continuously monitoring the change of position of at least one of said movable components of at least one section of said glassware forming machine, means responsive to said monitoring means for determining if said at least one monitored component is in the correct position; and means responsive to said determining means for changing the operation of said at least one section having a monitored component not in the correct position.

14. In a glassware forming machine having a plurality of sections, each of which includes a plurality of movable components which operate in timed relationship with respect to one another, a gob feeder for feeding gobs of molten glass at a uniform rate from a predetermined location to each of said sections, said sections forming rigid glassware articles from the gobs taken from said gob feeder, wherein said movable components are each actuated at respective relative times in each of a plurality of machine cycles, a controller for said glassware forming machine comprising:

timing means for generating a signal indicative of the time elapsed in each cycle of operation of said machine, a storage means for storing signals corresponding to the relative times in a cycle of machine operation when each of the plurality of components is to be actuated, means for reading out the contents of said storage means, comparator means responsive to said timing means and said readout means for comparing the times elapsed in each cycle with the relative component actuating times stored in said storage means, said comparator providing an actuating signal when a favorable comparison results, means responsive to said actuating signal for providing a component operating command to the component whose component actuating time compared with the cycle time elapsed, means for continuously monitoring the change of position of at least one of said movable components of each section of said glassware forming machine, means responsive to said monitoring means for determining if said monitored components are in the correct positions during the cyclic operation of said sections, and means responsive to said determining means for inhibiting the operation of said machine if at least one of said monitored components is not in the correct position.

15. In a glassware forming machine having a plurality of sections, each of which includes a plurality of movable components which operate in timed relationship with respect to one another, a gob feeder for feeding gobs of molten glass at a uniform rate from a predetermined location to each of said sections, said sections forming rigid glassware articles from the gobs taken from said gob feedeer, wherein said movable components are each actuated at respective relative times in each of a plurality of machine cycles, a controller for said glassware forming machine comprising:

timing means for generating a signal indicative of the time elapsed in each cycle of operation of said machine, a storage means for storing signals corresponding to the relative times in a cycle of machine operation when each of the plurality of components is to be actuated, means for reading out the contents of said storage means, comparator means responsive to said timing means and said readout means for comparing the times elapsed in each cycle with the relative component actuating times stored in said storage means, said comparator providing an actuating signal when a favorable comparison results, means responsive to said actuating signal for providing a component operating command to the component whose component actuating time compared with the cycle time elapsed, means for continuously monitoring the change of position of at least one of said movable components of said section of said glassware forming machine, means responsive to said monitoring means for determining if said monitored components are in the correct position during the cyclic operation of said sections, and means responsive to said determining means for initiating a machine stopping sequence at any time during a machine cycle if selected ones of said monitored components are not in the correct position at any time during said cycle.

16. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feedeer, wherein said movable components are each actuated at respective relative times in each of a plurality of machine cycles, a controller for said glassware forming machine comprising:

timing means for generating a signal indicative of the time elapsed in each cycle of operation of said machine, means responsive to said timing means for generating component operation commands for at least one movable component in a machine section at each of a plurality of times in the machine cycle, means for sequentially continuously scanning each of the movable components of said machine, means responsive to said scanning means for generating a signal representing the location of each of said movable components, means for storing the correct machine component locations for each movable component, means for comparing said generated signal representing the location of each movable component with said stored correct machine component locations, and means for generating a fault signal if at least one of said components is in an incorrect position.

17. The controller of claim 16 further comprising means for shutting down said glassware forming machine when at least a selected one of said movable components is in an incorrect position.

18. In a glassware forming machine having a plurality of sections each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, a method of controlling said glassware forming machine comprising the steps of:

generating a signal in synchronism with the machine cycle, said signal providing an indication of the elapsed time in each cycle of operation of said machine, generating a component operation command for at least one movable component of a section at each of a plurality of times in the machine cycle, continuously monitoring the position of at least one of said movable components of each section of said glassware forming machine, determining in response to said monitoring step if at least one monitored component is in the incorrect position during at least one portion of the cyclic operation of said section of said machine, and inhibiting the operation of said machine if at least one of said monitored components is not in the correct position.

19. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder wherein said movable components are each actuated at respective relative times in each of a plurality of machine cycles, the method of controlling said glassware forming machine comprising the steps of:

generating a signal in synchronism with said machine cycle for indicating the time elapsed in each cycle of operation of said machine, generating component operation commands for at least one movable component of a section at each of a plurality of times in the machine cycle,
continuously monitoring the change of position of at least one of said movable components of each section of said glassware forming machine,
determining if at least one monitored component is in the correct position, and
initiating a machine stopping sequence at any time during a machine cycle if at least one of said monitored components is not in a correct position at any time during said cycle.

20. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, the method of controlling said glassware forming machine comprising the steps of:
generating a signal for indicating the time elapsed in each cycle of operation of said machine,
generating component operation commands for the movable components of a machine section at each of a plurality of times in the machine cycle,
continuously monitoring the position of at least one of said movable components of said section of said machine,
generating in repsonse to said monitoring means a signal representing the location of said at least one movable component at each of a plurality of time intervals in said machine cycle,
storing a signal corresponding to the correct machine component location of said at least one movable component for each of said plurality of time intervals in said machine cycle,
comparing said generated signal representing the location of said at least one movable component with said stored correct machine component location signal at each of said time intervals, and
generating a false signal if said at least one movable component is in an incorrect position.

21. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feeder, wherein said movable components are each actuated at respective relative times in each of a plurality of machine cycles, the method of controlling said glassware forming machine comprising the steps of:
generating a signal indicating the time elapsed in each cycle of operation of said machine,
generating component operation commands for the movable components of a section at each of a plurality of times in a machine cycle,
continuously monitoring the change of position of at least one of said movable components of said section of said machine,
determining in response to said monitoring step if said at least one monitored component is in a correct position during the cyclic operation of said section, and
varying in response to said determining means the actuating time of said at least one monitored component if said at least one component is not in a correct position to thereby move said component into said correct position.

22. In a glassware forming machine having a plurality of sections, each of which includes a plurality of movable components which operate in timed relationship with respect to one another, a gob feeder for feeding gobs of molten glass from a predetermined location to each of said sections, said section forming rigid glassware articles from the gobs taken from said gob feeder, wherein said movable components are each actuated at respective relative times in each of a plurality of machine cycles, the method of controlling said glassware forming machine comprising the steps of:
generating a signal indicating the time elapsed in each cycle of operation of said machine,
generating component operation commands for the movable components of a section at each of a plurality of times in a machine cycle,
continuously monitoring the change of position of at least one of said movable components of said section of said machine,
determining in response to said monitoring step if said at least one monitored component is in a correct position, and
generating in response to said determining step a stopping sequence at any time during a machine cycle if said at least one monitored component is not in the correct position at any time during said cycle.

23. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feedeer, wherein said movable components are each actuated at respective relative times in each of a plurality of machine cycles, the method of controlling said glassware forming machine comprising the steps of:
generating a signal for indicating the time elapsed in each cycle of operation of said machine,
generating component operation commands for the movable components of each machine section at each of a plurality of times in a machine cycle,
continuously monitoring the change of position of at least one of said movable components of said section of said machine,
determining if said at least one monitoring component in each section of said machine is in the correct position during at least one portion of the cyclic operation of each section, and
changing the operation of said machine if said at least one monitored component in each section is not in a correct position.

24. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feedeer, wherein said movable components are each actuated at respective relative times in each of a plurality of machine cycles, the method of controlling said glassware forming machine comprising the steps of:

generating a signal for indicating the time elapsed in each cycle of operation of said machine, generating component operation commands for each movable components of a section during the machine cycle, continuously monitoring each of the movable components of said machine, generating in response to said monitoring step a signal representing the location of each of said movable components, storing a signal corresponding to the correct machine component location for each movable component, comparing said generated signal representing the location of each of said movable components with the corresponding stored correct machine component location signal, and generating a false signal if at least one of said movable components is in an incorrect position.

25. In a glassware forming machine having a plurality of sections, each of which includes a plurality of movable components which operate in timed relationship with respect to one another, a gob feeder for feeding gobs of molten glass from a predetermined location to each of said sections, said sections forming rigid glassware articles from the gobs taken from said gob feedeer, wherein said movable components are each actuated at respective relative times in each of a plurality of machine cycles, the method of controlling said glassware forming machine comprising the steps of:

generating a signal for indicating the time elapsed in each cycle of operation of said machine, generating component operation commands for the movable components during the machine cycle, continuously monitoring the position of each of the movable components of said machine at each of a plurality of time intervals, generating a signal representing the location of each of said movable components at each of said time intervals, storing a signal corresponding to the correct machine component locations for each of said movable components at each of said time intervals, comparing said generated signal representing the location of each movable component with said stored correct machine component location signal at each time interval, and generating a false signal if at least one of said components is in an incorrect position.

* * * * *